UNITED STATES PATENT OFFICE.

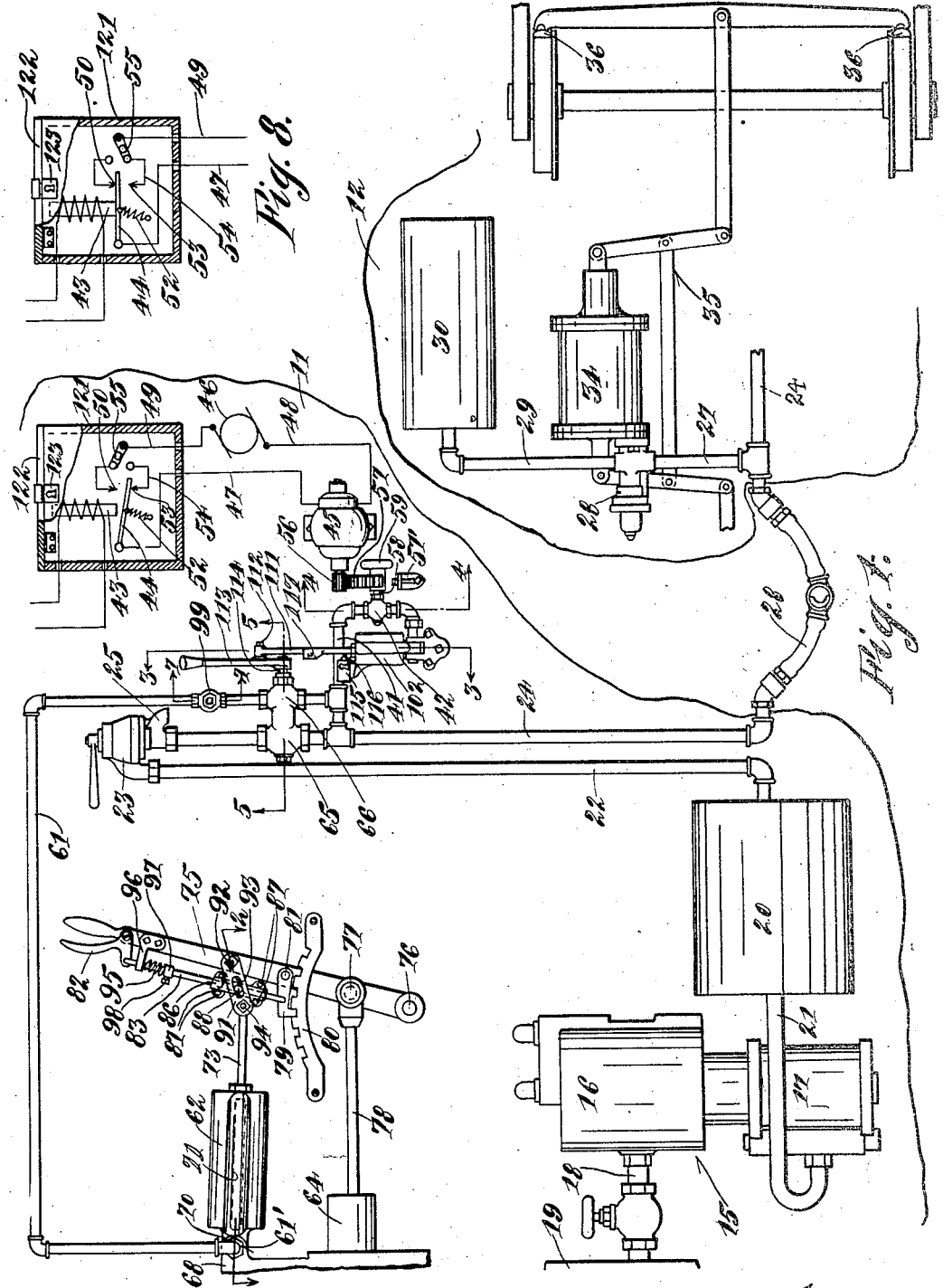

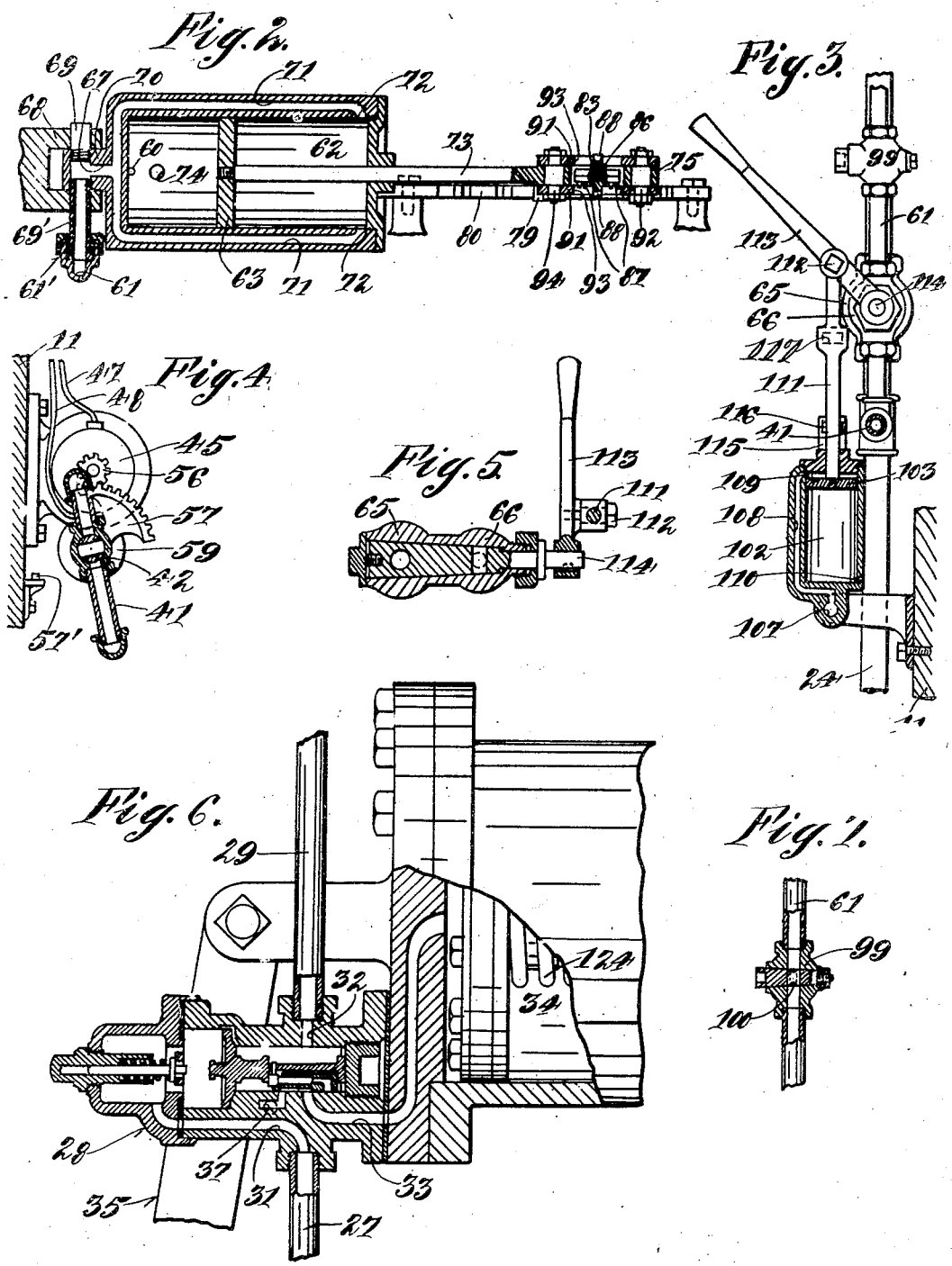

ALFRED L. RUTHVEN, OF TOPEKA, KANSAS.

CONTROLLING MECHANISM.

1,058,107.

Specification of Letters Patent.

Patented Apr. 8, 1913.

Application filed April 22, 1912. Serial No. 692,489.

*To all whom it may concern:*

Be it known that I, ALFRED L. RUTHVEN, a citizen of the United States, residing at Topeka, in the county of Shawnee and State of Kansas, have invented certain new and useful Improvements in Controlling Mechanism, of which the following is a specification.

My invention relates to controlling mechanism applicable for controlling propelled vehicles, and I have illustrated the same in connection with a steam propelled vehicle, although it is obvious that the same may be employed in other relations.

My invention consists in novel means for automatically controlling the propelling means of the vehicle and the braking means therefor, and in connecting the power supplying means and the braking means in novel manner whereby action in both will take place in emergency for interrupting power application and for applying the braking mechanism.

My invention consists further in novel means for actuating the power interrupting device; further in novel means for actuating the compressed fluid valves, and the invention will be further readily understood from the following description and claims, and from the drawings, in which latter:

Figure 1 is a diagrammatic representation of my improved controlling mechanism. Fig. 2 is an irregular section taken on the line 2—2 of Fig. 1, showing the throttle-operating mechanism. Fig. 3 is a view, partly in section on the line 3—3 of Fig. 1, and partly in side elevation, showing the mechanism for controlling the compressed fluid valves. Fig. 4 is a sectional detail of the motor-controlled valve taken on the line 4—4 of Fig. 1, showing the motor connections therewith in side elevation. Fig. 5 is a sectional view of the valve mechanism for controlling the compressed fluid, taken on the line 5—5 of Fig. 1. Fig. 6 is an axial section of the automatic triple-valve of the vehicle, also showing the air-brake cylinder partly in section and partly broken away. Fig. 7 is a section of the regulating valve in the relief-pipe of the air-brake piping, taken on the line 7—7 of Fig. 1; and Fig. 8 is a modification showing the relation of the adjacent parts of the track and motor circuits when a closed track circuit is employed.

My invention is applicable to steam propelled vehicles and to vehicles in which other propelling power is employed, and the actuating means for the throttle mechanism may be employed for actuating other interrupting means, dependent on the character of propelling power employed.

11 indicates the body of the locomotive and 12 the body of the car.

I have shown my invention applied in connection with a usual automatic air-brake system for braking the vehicle or vehicles. This air-brake system comprises an air-pump 15 embracing a steam-cylinder 16 and a pump-cylinder 17, in which suitable connected pump and steam pistons reciprocate in usual manner, supplied by power from a steam-pipe 18 having connection with the locomotive boiler 19. The pump discharges the compressed air or fluid into a main pressure tank 20, having connection with the pump by a pipe 21, and from which a feed-pipe 22 leads to a usual engineer's or driver's brake-valve 23, from which latter a brake-pipe 24 leads to the various vehicles of the train, this latter pipe being also in practice designated the train-pipe. Usual valves are provided in these parts.

The driver's brake valve 23 may be of any ordinary or usual construction. The valve 23 is operated manually by the driver of the vehicle for affording passage from the feed-pipe 22 to the brake-pipe 24, during which relation of the parts the outlet-port is closed, or for closing off the feed-pipe and effecting communication between the brake-pipe and the outlet 25, for relieving pressure in the brake-pipe and thereby setting the brakes in well-known manner.

28 is a usual flexible section of the brake-pipe between the rigid sections thereof on adjacent vehicles.

On each of the vehicles in rear of the locomotive a branch 27 of the brake-pipe leads to a usual automatic triple-valve 28, from which an auxiliary pipe 29 leads to an auxiliary reservoir 30. The automatic triple-valve is of usual construction and is shown in its simplest form in the drawings, and operates in usual and well-known manner. It has a port 31 connecting with the brake-pipe, a port 32 connecting with the auxiliary reservoir, and a port 33 connecting with the brake-cylinder 34, having connection by means of ordinary link mechanism 35 with usual brake-shoes 36. The automatic triple-valve also has a port 37 to the atmosphere.

The brake-cylinder and its connections are of any usual and well-known constructions, and operate in usual and well-known manner.

41 is a branch-pipe extending from the brake-pipe for connecting with mechanism for operating valves in the brake-pipe 24 and relief-pipe hereinafter mentioned. It has a valve 42 therein which is under control of a suitable track or block system such, for instance, as shown and described in Letters Patent of the United States No. 989,194, granted me for signal systems for railways, April 11, 1911. The system shown and described in said patent is what is known as an open circuit system, but my improved device is applicable in either a closed or open circuit system. Either system may include a suitable switch operating device, shown as a magnet 43, controlling an automatic switch 44 located in a motor circuit which embraces a motor 45, a suitable generator 46, conductors 47, 48 and 49, and a terminal 50 with which the armature of the switch 44 coacts, a spring 52 retracting said armature. The motor circuit is normally open, and in the arrangement shown in Fig. 1, the magnet 43 would be located in an open block circuit which when closed energizes the magnet for attracting the armature. A terminal 53 may also be provided, having a conductor 54 leading therefrom. A switch 55 is arranged to interrupt the conductor 49 and place the terminal 53 in electric connection with the generator. If the magnet 43 be located in a closed track circuit, for permitting actuation of the switch 44 upon breaking of said circuit, the armature of the automatic switch 44 is normally attracted by the magnet 43, (see Fig. 8,) the interruption of said closed track circuit causing the armature to be released from the magnet and brought into contact with the terminal 53 by the spring 52, for closing the motor circuit and operating the motor.

The armature-shaft of the motor has a pinion 56 thereon arranged to mesh with a segment-gear 57 on the stem 58 of the valve 42 for opening said valve, for the purpose hereinafter described, this valve being normally closed. The pinion will turn the segment for opening the valve and, in the form shown, will then rotate freely until it strikes a stop 57', the segment being arranged to be turned so that its first teeth will again mesh with the pinion by means of the hand-wheel 59, the valve remaining open preferably until said meshing takes place.

A branch-pipe 61, which forms a relief-pipe, leads from the brake-pipe, physical connection thereof being shown with the branch-pipe 41. It connects with a cylinder 62 in which there is a piston 63 connecting with a power interrupting means, indicated as a throttle 64.

There is a valve 65 in the feed-pipe 24 and a valve 66 in the relief-pipe 61, the stems of these valves being connected for combined movement and the ports thereof being so arranged that when one of said valves is open the other is closed, and vice versa. When the valve 65 is closed and the valve 66 open, the pressure in the brake-pipe will be relieved and the automatic triple-valves on the vehicles actuated for setting the brakes, the action of these automatic valves being well-known and not necessary to be here further described.

The piston-cylinder 62 has articulated connection with the branch-pipe so as to permit a swinging movement of the cylinder but arranged in such manner that the port 67 between said cylinder and said pipe is open at all times. Thus 68 is a bearing-piece stationarily secured, as to the locomotive boiler, in which trunnions 69, 69' on the hinge-lug 70 of the cylinder 62 are journaled, the trunnion 69' being formed by a section of the pipe 61 having rotative connection 61' with said pipe. Passages 71 communicate with the port and extend lengthwise of the cylinder and have entrance ports 72 into the interior of the cylinder for pushing the piston inwardly and thereby actuating the stem 73 thereof inwardly. The piston is moved inwardly by the pressure in the pipes to a point to expose a relief-port 74 in the cylinder at the intake side of the piston and afford escape of the compressed fluid through the cylinder and the relief-port, for affording relief in the brake-pipe and thereby automatically setting the brakes. The cylinder may be provided with an exhaust-port 60 for permitting exhausting of the air in the rear end of the cylinder and free movement of the piston therein.

75 is a throttle-lever pivoted at 76 to a suitable stationary part, as to the boiler, and having articulation at 77 with a throttle-stem 78.

79 is a locking pawl arranged to coact with the teeth of a locking rack 80. The pawl is pivoted at 81 to the throttle-lever.

82 is a manually operated bell-crank lever connected by means of a link 83 with the pawl.

86 is a block adjustably clamped to the link 83, as by means of bolts 87, for adjustably positioning the block lengthwise of the link, the block being preferably divided into two parts each of which has a pin 88 thereon.

91, 91, are links pivoted at 92 to the throttle-lever, each of which is provided with a slot 93 in which one of the pins 88 is received. The outer ends of the links have a pin 94 passing therethrough, forming articulation between said links and the throttle-stem 78. A spring 95 between a bracket 96 on the throttle-lever and a collar 97 adjustably set lengthwise of the link 83 by means of a set-screw 98 normally urges the locking-pawl toward the locking rack. The construction is simple and so arranged as to be easily applied to any throttle-lever. The throttle-stem and the links 91 are out of parallelism when the pawl 79 is in locking engagement. When the fluid pressure is admitted into the cylinder 62 it moves the stem 70 and the links 91 into positions more nearly parallel with each other, thereby moving the link 83 lengthwise and compressing the spring 95 and unlocking the pawl 79, and, as soon as the pawl is unlocked, moving the throttle-lever for closing the throttle and thereby shutting off the steam from the locomotive boiler to the driving cylinders of the locomotive and interrupting the motive power of the vehicle.

The relief-pipe 61 may have a valve 99 therein for regulating the maximum current passing through said branch-pipe, this valve being of such construction as to permit its regulation by means of a key in the hands of an authorized person other than the driver of the vehicle, but constructed to prevent entire closing of the valve, for instance by having a bypass passage 100 through said valve.

The valves 65, 66, are operated through the instrumentality of the valve 42, which, with the motor mechanism, forms interrupting actuating means for said first-named valves. The branch 41 connects with a cylinder 102 which has a piston 103 therein constructed similarly to the cylinder 62 and piston 63, except that the relief-port 74 is omitted. The cylinder 102 has a port 107 with which passages 108 communicate, the port being in continuous communication with the branch-pipe 41, by connections similar to the connections between the port 67 and the relief-pipe 61, the cylinder 102 being pivotally supported similar to the cylinder 62. The passages 108 have entrance-ports 109 at one side of the piston, and the cylinder has an exhaust opening 110 at the other side of said piston.

111 is a piston-stem which has articulation 112 with a lever 113 on the stem 114 of the valves 65, 66.

115 is a lock shown rigid on the cylinder 102, the keeper 116 of which is arranged to be received in a recess 117 of the piston-stem 111 for locking the piston-stem in the operated positions of the valves 65, 66, in which positions the valve 65 is closed and the valve 66 is open for actuating the piston 63 to expose the relief-port 74 and thereby relieve the pressure in the brake-pipe and set the brakes, the lock 115 maintaining the valves 65, 66, in such positions until the valves are released by unlocking the lock 115 by an authorized person other than the driver of the vehicle having the key for said lock, whereupon the lever 113, shown as a hand-operated lever, may be manipulated. The magnet 43 and parts actuated thereby may be within a closed casing 121, shown broken away in Figs. 1 and 8, having a door 122 arranged to be locked by a lock 123 arranged to be opened only by an authorized person other than the driver of the vehicle having the key thereof. By these means the automatic devices on the traveling vehicle are out of control of the driver thereof, so that the same may not be changed or tampered with by him or by any person not in possession of the keys opening the locks by which the various devices are closed.

As soon as the armature of switch 44 is operated, the motor 45 is energized for opening the valve 42. As soon as the valve 42 is open, the piston 103 will be actuated for closing the valve 65 and opening the valve 66, whereby the fluid pressure in the brake-pipe is at once communicated to the cylinder 62 for operating the piston 63 and thereby operating the throttle-lever and closing the throttle and shutting off the motive power of the vehicle. As soon as the piston 63 has been moved to a position to expose the relief-port 74, the fluid pressure in the brake-pipe is relieved for setting the brakes, these operations being performed in quick succession in the sequence named and almost simultaneously. When the parts have thus been set, the braking mechanism is for the reason stated out of control of the driver of the vehicle. The object of placing these parts beyond the control of the driver of the vehicle is to prevent unauthorized controlling of the safety mechanism by the engineer.

It will be understood that in an automatic air-brake system the spring 124 in the brake-cylinder normally holds the brakes in unbraking positions, the admission of the fluid pressure into said cylinder through the port of the automatic triple-valve connecting therewith setting the brakes.

Having thus fully described my invention, what I claim as new and desire to secure by Letters Patent, is:

1. A controlling mechanism of the character described, comprising a means for interrupting the propelling means of a traveling vehicle, said means comprising a swingable fluid-actuated means; an automatic air-brake system comprising a main pressure reservoir, an auxiliary pressure reservoir, a brake-cylinder, an automatic triple-valve between said brake-cylinder and said auxiliary pressure reservoir, a compressed fluid pipe between said main pressure reservoir and said automatic triple-valve, and a driver's controlling valve therein; and a relief-pipe having connection with said compressed fluid-pipe between said driver's controlling valve and said automatic triple-valve and with said fluid-actuated means for actuating the latter.

2. A controlling mechanism of the character described, comprising a means for interrupting the propelling means of a traveling vehicle, said means comprising a swingable fluid-actuated means; an automatic air-brake system comprising a main pressure reservoir, an auxiliary pressure reservoir, a brake-cylinder, an automatic triple-valve between said brake-cylinder and said auxiliary pressure reservoir, a compressed fluid-pipe between said main pressure reservoir and said automatic triple-valve, and a driver's controlling valve therein; a relief-pipe having connection with said compressed fluid-pipe between said driver's controlling valve and said automatic triple-valve and with said fluid-actuated means, a valve in said relief-pipe, a controlled circuit, and actuating means for said last-named valve controlled by said controlled circuit.

3. A controlling mechanism of the character described, comprising a means for interrupting the propelling means of a traveling vehicle; an automatic air-brake system comprising a main pressure reservoir, an auxiliary pressure reservoir, a brake-cylinder, an automatic triple-valve between said brake-cylinder and said auxiliary pressure reservoir, a compressed fluid-pipe between said main pressure reservoir and said automatic triple-valve, and a driver's controlling valve therein; a relief-pipe having connection with said compressed fluid-pipe and with said first-named means, a valve in said relief-pipe, an additional valve, a controlled circuit, actuating means for said additional valve controlled by said controlled circuit, and operating means for the said valve in said relief-pipe actuated by compressed fluid passing through said additional valve.

4. A controlling mechanism of the character described, comprising a means embracing a cylinder and piston for interrupting the propelling means of a traveling vehicle; an automatic air-brake system comprising a main pressure reservoir, an auxiliary pressure reservoir, a brake-cylinder, an automatic triple-valve between said brake-cylinder and said auxiliary pressure reservoir, a compressed fluid-pipe between said main pressure reservoir and said automatic triple-valve, and a driver's controlling valve therein; a relief-pipe having connection with said compressed fluid-pipe and with said first-named means, a valve in said compressed fluid-pipe, a valve in said relief-pipe, said last-named valves connected for combined movements, compressed fluid actuating means for said last-named valves, an additional valve controlling said compressed fluid actuating means, and a controlled circuit embracing a motor having connection with said additional valve.

5. A controlling mechanism of the character described, comprising a means embracing a cylinder and piston for interrupting the propelling means of a traveling vehicle; an automatic air-brake system comprising a main pressure reservoir, an auxiliary pressure reservoir, a brake-cylinder, an automatic triple-valve between said brake-cylinder and said auxiliary pressure reservoir, a compressed fluid-pipe between said main pressure reservoir and said automatic triple-valve, and a driver's controlling valve therein; a relief-pipe having connection with said compressed fluid-pipe, a valve in said compressed fluid-pipe, a valve in said relief-pipe, said last-named valves connected for combined movement, compressed fluid actuating means for said last-named valves, an additional valve controlling said compressed fluid actuating means, a controlling circuit embracing a motor having connection with said additional valve, and locking means for said compressed fluid actuating means.

6. A controlling mechanism of the character described, comprising a means embracing a cylinder and piston for interrupting the propelling means of a traveling vehicle; an automatic air-brake system comprising a main pressure reservoir, an auxiliary pressure reservoir, a brake-cylinder, an automatic triple-valve between said brake-cylinder and said auxiliary pressure reservoir, a compressed fluid-pipe between said main pressure reservoir and said automatic triple-valve, and a driver's controlling valve therein; a relief-pipe having connection with said compressed fluid-pipe, a valve in said compressed fluid-pipe, a valve in said relief-pipe, said last-named valves connected for combined movements, compressed fluid actuating means for said last-named valves, an additional valve controlling said compressed fluid actuating means, a controlled circuit embracing a motor having connection with said additional valve, said controlled circuit comprising an automatic switch, a magnet for a track circuit for said automatic switch, locking means for said switch and magnet, and locking means for said compressed fluid valve actuating means.

7. A controlling mechanism of the character described, comprising a means embracing a swingable cylinder and piston for interrupting the propelling means of a traveling vehicle; an automatic air-brake system comprising a main pressure reservoir, an auxiliary pressure reservoir, a brake-cylinder, an automatic triple-valve between said brake-cylinder and said auxiliary pressure reservoir, a compressed fluid-pipe between said main pressure reservoir and said automatic triple-valve, and a driver's controlling valve therein; a relief-pipe having connection with said compressed fluid-pipe between said driver's controlling valve and said automatic triple-valve and with said swingable cylinder of said first-named means, said first-named means embracing a relief-port automatically exposed to operative connection with said relief-pipe for relieving the pressure in said relief-pipe, for the purpose described.

8. In a mechanism of the character described, the combination of a compressed fluid supply-pipe, a compressed fluid relief-pipe, a valve in each of said pipes connected for combined movements, a controlled circuit, and actuating means for said valves controlled by said circuit, said actuating means having a mutilated driving connection therein disconnected by the actuation thereof.

9. In a mechanism of the character described, the combination of a compressed fluid supply-pipe, a compressed fluid relief-pipe, a valve in each of said pipes connected for combined movements, a controlled circuit, interrupting actuating means for said valves controlled by said circuit, and locking means for locking said actuating means in actuated position.

10. In a mechanism of the character described, the combination of a compressed fluid supply-pipe, a compressed fluid relief-pipe, a valve in each of said pipes connected for combined movements, a controlled circuit, interrupting actuating means for said valves controlled by said circuit, said actuating means comprising a cylinder and a piston, a compressed fluid connection, a normally closed valve in said compressed fluid connection having connection with said cylinder and piston, and operating means for said last-named valve controlled by said controlled circuit.

11. In a mechanism of the character described, the combination with a compressed fluid supply-pipe, a compressed fluid relief-pipe, a valve in each said pipes connected for combined movements, a cylinder and piston for operating said valves, a compressed fluid connection having connection with said cylinder and piston, a normally closed valve in the latter, a controlled circuit, and operating means for said normally closed valve controlled by said controlled circuit, and locking means for the movable member of said cylinder and piston.

12. In a mechanism of the character described, the combination of a means comprising a cylinder and piston for interrupting the propelling means of a traveling vehicle, said cylinder being pivoted and having a pivot-port, an automatic fluid pressure brake mechanism comprising fluid pressure connections for normally maintaining a brake in unbraking position, a relief-pipe therefor having connection with said pivot-port, and a compressed fluid passage through said pivot-port opening at one side of said piston, and a relief-port at the other side of said piston arranged by movement between said cylinder and piston to be located at said first-named side of said piston for acting as a relief opening through said pivot-port for said relief-pipe.

13. In a mechanism of the character described, the combination of a valve, actuating means for said valve comprising a swingable cylinder and a piston, a compressed fluid connection having connection with said cylinder and piston, a normally closed valve in said last-named connection, a controlled circuit, and operating means for said last-named valve controlled by said controlled circuit.

14. In a mechanism of the character described, the combination of a relief-pipe, a pair of valves therein, a cylinder and piston having operative articulated connection with said relief-pipe and operative connection with one of said valves for operating the same, the other of said valves being located between said last-named valve and said cylinder and piston, a controlled circuit, and a motor controlled by said circuit for operating said last-named valve.

15. In a mechanism of the character described, the combination of a power controlling lever, a fluid pressure relief-pipe, a cylinder and piston having connection with said relief-pipe, a stem for said piston, a link articulated with said stem and said lever, a lock for said lever embracing a longitudinally movable rod, a clamp-block adjustably secured lengthwise on said rod and having articulation with said link, said link and stem normally out of parallelism, said cylinder having a pivot-port connecting with said relief-pipe, and said cylinder provided with a relief-port exposed by said piston upon actuation of said piston, and arranged and operating substantially as described.

16. In a mechanism of the character described, the combination of a brake-pipe, a relief-pipe, a valve in the latter, a controlling valve for the latter, a controlled circuit embracing a motor, actuating means between said motor and controlling valve, means for causing disconnection in said actuating means for limiting the movement of said controlling valve, a cylinder with which said controlling valve has connection, and a piston in said cylinder having operative connection with said first-named valve for actuating the same upon actuation of said piston by the opening of said controlling valve, substantially as described.

17. In a mechanism of the character described, the combination of a brake-pipe, a relief-pipe, a valve in the latter, a controlling valve for the latter, a controlled circuit embracing a motor, actuating means between said motor and said controlling valve, means for causing disconnection in said actuating means for limiting the movement of said controlling valve, a cylinder with which said last-named valve has connection, the piston in said cylinder having operative connection with said first-named valve for actuating the same upon actuation of said piston by the opening of said controlling valve, a throttle-lever, a cylinder and piston having articulated connection therewith, said last-named cylinder having a pivot-port connecting with said relief-pipe, said last-named port having continuous connection with said first-named valve, substantially as described.

18. In a mechanism of the character described, the combination of a brake-pipe, a relief-pipe, a valve in the latter, a controlling valve for the latter, a controlled circuit embracing a motor, actuating means between said motor and said controlling valve, means for causing disconnection in said actuating means for limiting the movement of said controlling valve, a cylinder with which said last-named valve has connection, a piston in said cylinder having operative connection with said first-named valve for actuating the same upon actuation of said piston by the opening of said controlling valve, and a lock between said piston and cylinder for locking the same in actuated relation.

19. In apparatus of the character described, a throttle lever, latch means to normally hold the same against movement, a bodily swinging cylinder, a piston operating therein, adjustable connecting means between the piston and said latch means, and means to supply pressure into the cylinder.

20. In a mechanism of the character described, the combination of a valve, actuating means for said valve comprising a cylinder and a piston, a lock for maintaining said cylinder and piston in actuated relation, a compressed-fluid connection having connection with said cylinder and piston, a normally closed valve in said last-named connection, a controlled circuit, and operating means for said last-named valve controlled by said controlled circuit.

21. In apparatus of the character described, the combination of a fluid-pipe, a valve therein, a second valve, valve actuating means having operative connection with said first-named valve for actuating the same, a lock for said valve-actuating means brought into locking relation by the actuation of said valve, said second-named valve having fluid-connection with said valve-actuating means for actuating the same, and means for actuating said second-named valve.

22. In apparatus of the character described, the combination of a fluid-pipe, a valve therein, a second valve, valve-actuating means having operative connection with said first-named valve for actuating the same, a lock for said valve-actuating means brought into locking relation by the actuation of said valve, said second-named valve having fluid connection with said valve-actuating means for actuating the same, means for actuating said second-named valve, inclosing means for a portion of said last-named means, and locking means for the latter.

23. In apparatus of the character described, the combination of a relief-pipe, a pair of valves therein, a cylinder and piston device having operative articulated connection with said relief-pipe and operative connection with one of said valves for operating the same and comprising a movable member, a latch for locking the movable member of said cylinder and piston device, the other of said valves being located between said last-named valve and said cylinder and piston device, a controlled circuit, and a motor controlled by said circuit for operating said last-named valve.

24. In apparatus of the character described, the combination of a fluid-pipe, a valve therein, a controlling valve for the latter, a pivoted piston and cylinder device between said valves comprising a pivot-port having connection with said fluid-pipe, operative connecting means between said pivoted piston and cylinder device and said first-named valve for actuating said first-named valve, and means for operating said controlling valve.

25. In apparatus of the character described, the combination of an interrupting means for the propelling means of a traveling vehicle, a fluid-actuated device having connection with said interrupting means for actuating the same and embracing a pivoted member having a pivot-port, a fluid-pipe having connection with said pivot-port, a latch for said interrupting means, and connecting means between said pivoted member and latch for releasing said latch.

26. In apparatus of the character described, the combination of a means comprising a cylinder and piston for interrupting the propelling means of a traveling vehicle, said cylinder being pivoted and having a pivot-port, a fluid-pipe having connection with said pivot-port, and a fluid-passage through said pivot-port opening at one side of said piston, and a relief-port at the other side of said piston, arranged by movement between said cylinder and piston to be located at said first-named side of said piston for acting as a relief-opening through said pivot-port for said fluid-pipe.

27. In apparatus of the character described, the combination of a power-controlling lever, a cylinder and piston embracing a pivoted member and a longitudinally movable member, a latch for said lever embracing a longitudinally movable rod, a link operatively connected with said longitudinally movable member, said lever and said latch, said pivoted member having a pivot-port, and a fluid-pipe connecting therewith.

28. In apparatus of the character described, the combination of a power-controlling lever, a fluid-pipe, a cylinder, a piston therefor, a link articulated with said piston and said lever, a latch for said lever, and a connecting part adjustably secured thereto and having articulation with said link, and said cylinder having a pivot-port connecting with said fluid-pipe.

29. In apparatus of the character described, the combination of a lever for means for interrupting the propelling means of a traveling vehicle, a bodily swinging cylinder and piston therefor forming a pair of swingable members having a pivot-port, and connecting means between said lever and one of said pair of members.

30. In apparatus of the character described, the combination of a lever for means for interrupting the propelling means of a traveling vehicle, a bodily swinging cylinder and piston therefor forming a pair of swingable members having a pivot-port, connecting means between said lever and one of said pair of members, latch means for normally holding said lever against movement, and adjustable connecting means between said pair of members and said latch means.

31. In apparatus of the character described, the combination of a lever for means for interrupting the propelling means of a traveling vehicle, a bodily swinging cylinder having a pivot-port, a piston operating therein, fluid-connecting means between said pivot-port and the swinging end of said cylinder for conducting the fluid to the outer face of said piston, and connecting means between said piston and lever.

In testimony whereof, I have hereunto signed my name in the presence of two subscribing witnesses.

ALFRED L. RUTHVEN.

Witnesses:
ARTHUR F. RUTHVEN,
T. J. MOFFETT.